Nov. 16, 1926.  1,607,483
A. E. SCHARF ET AL
DRIVE
Filed July 21, 1926  2 Sheets-Sheet 1

C. A. Seifert
A. E. Scharf  INVENTOR
BY Victor J. Evans
ATTORNEY

R. Q. Thomas

WITNESS:

Nov. 16, 1926.
A. E. SCHARF ET AL
1,607,483
DRIVE
Filed July 21, 1926    2 Sheets-Sheet 2
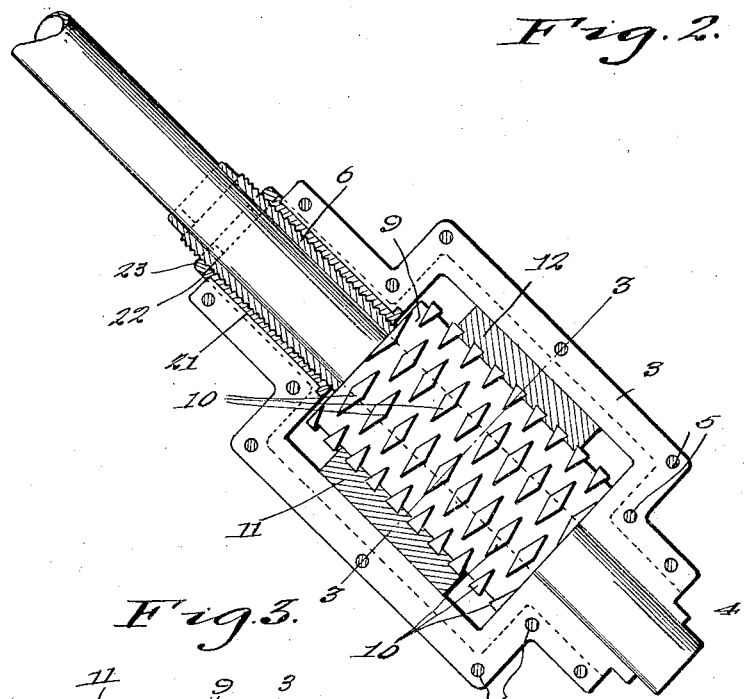
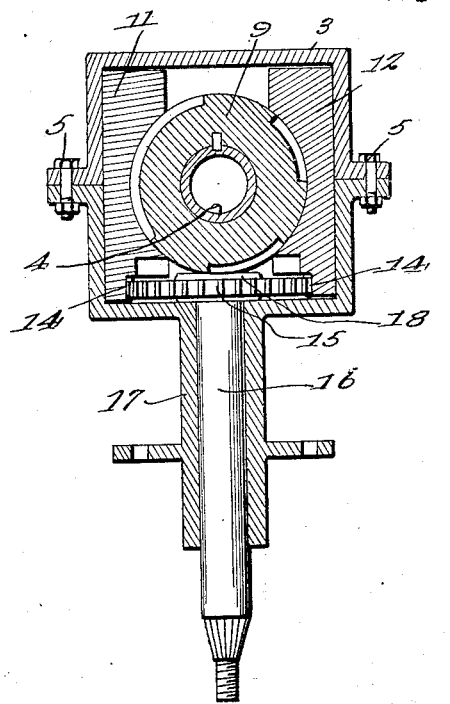
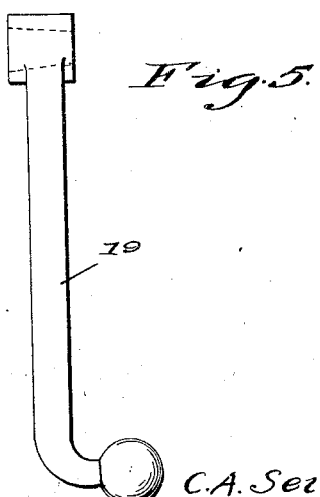
C.A. Seifert
A.E. Scharf. INVENTOR
BY Victor J. Evans
ATTORNEY
R. A. Thomas
WITNESS:

Patented Nov. 16, 1926.

1,607,483

UNITED STATES PATENT OFFICE.

ARTHUR E. SCHARF, OF MILWAUKEE, AND CHARLES A. SEIFERT, OF WAUKESHA, WISCONSIN.

DRIVE.

Application filed July 21, 1926. Serial No. 124,019.

The present invention has reference to a steering device for automobiles or like vehicles, and our primary object is the provision of mechanism that will insure a positive drive when the steering rod is turned in either direction.

A further object is the provision of a steering mechanism in which the steering rod is provided with a double threaded worm whose threads engage with half nuts so that when the rod is turned the nuts will be moved longitudinally in opposite directions, said half nuts provided with rack surfaces for engagement with a toothed wheel on a shaft to which the steering arm is connected, so that a positive drive between the steering rod, the steering arm and the steering arm thrust rod is insured and further wherein the parts are so associated that the same are sustained from accidental movement or disalignment.

To the attainment of the above broadly stated objects and others which will present themselves as the nature of the invention is better understood, the improvement consists in certain novel features of construction, combination and operative association of parts, a satisfactory embodiment of which is disclosed by the accompanying drawings.

In the drawings:

Figure 2 is an elevation with parts in section to illustrate the manner in which the half nuts are housed and the engagement of said nuts with the double threaded worm screw on the steering rod.

Figure 3 is a sectional view on the line 3—3 of Figure 2.

Figure 5 is a side elevation of the steering arm.

Figure 1:
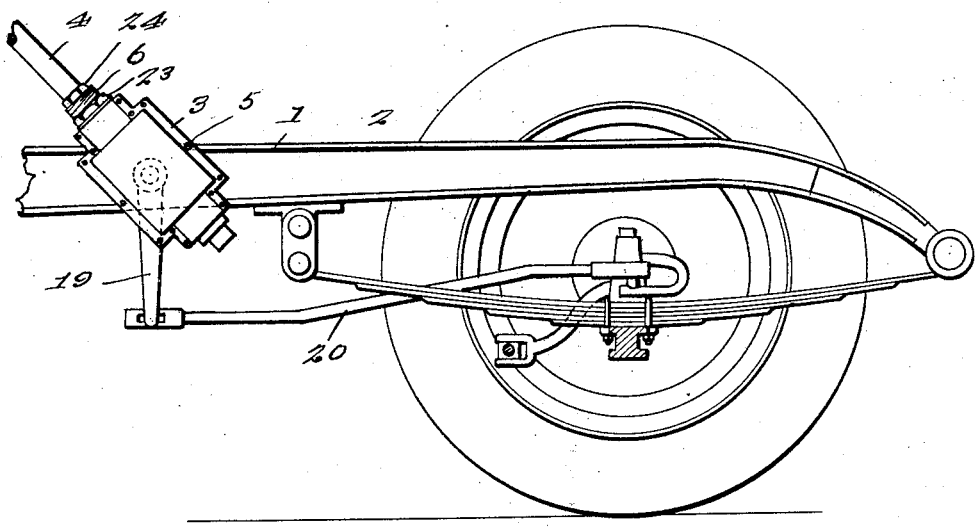
Figure 1 is a side elevation of the chassis of an automobile to illustrate the application of our improvement thereon.
Figure 4:
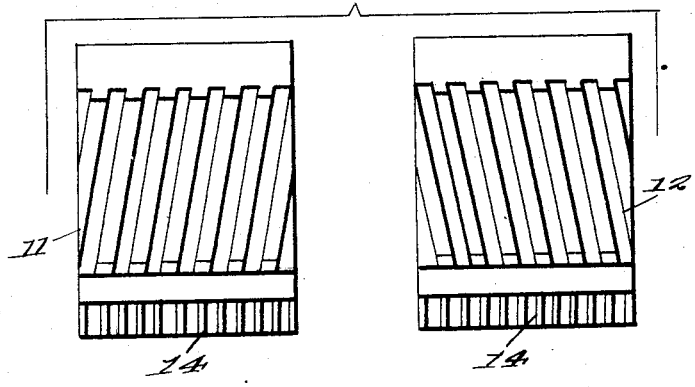
Figure 4 is a plan view looking toward the inner face of the half nuts employed.

Supported in the usual manner on the frame 1 of an automobile chassis 2 there is a housing 3 in which is journaled the lower end of the steering rod 4 for the machine. In the present instance, the housing 3 is of rectangular formation and is constructed of two complementary sections, each having their edges flanged and securing elements 5 passing through the said flanges. The housing 3 has its ends provided with rounded and reduced extensions to receive therein the steering rod 4 or elements associated therewith. The upper extension has a threaded bore in which is screwed a sleeve 6 for the steering rod 4. The steering rod 4 is hollow and is enclosed in the usual steering column (not shown) and the said steering rod, at the part thereof received in the housing has keyed thereon, an enlarged and elongated cross sectionally rounded portion or head 9. The head 9 is peripherally formed with a double hand threaded worm screw. The threads of the screw are necessarily formed by substantially diamond-shaped projections 10, and the right and left hand threads thus provided engage respectively right and left hand threads on the inner faces of half nuts 11 and 12, respectively. These nuts are properly guided in the sides of the housing, and each of the said nuts, adjacent to what we will term the lower end, is grooved and the inner walls of the said grooves are formed with series of teeth 14. These teeth are engaged by a toothed wheel 15 on a shaft 16 that is journaled through a suitable bearing sleeve 17 on the side of the casing 3. The toothed wheel 15 has an inner hub enlargement 18 against which the worm wheel 9 contacts. This contacting engagement assists in holding the worm wheel properly positioned in the housing and likewise assists in sustaining the half nuts properly positioned in said housing. The shaft 16 has an outer conical end which is preferably ribbed or otherwise roughened and the said end is designed to be received in the cone-shaped bore in the hub portion of the steering arm 19. The steering arm 19 has a ball head connection with a socket in one end of the steering arm thrust rod 20.

The outer end of the housing is flanged to provide an effective bearing for the hollow steering rod and the inner reduced end of the housing receives in the bore thereof an interiorly threaded bushing 21 which threadedly engages the sleeve 6. Screwed on the sleeve and resting on the outer and flanged end 22 of the bushing there is a hexagon lock nut 23. The outer end of the sleeve 6 is non-threaded but is formed with angle facets 24 for engagement by the jaws of a wrench whereby any wear on the threads of the half nuts or the double threaded head of the hollow steering rod may be compensated for and also whereby an adjustment between such parts may be made.

It is believed that the foregoing description when carefully read in connection with the accompanying drawings, will fully set forth the simplicity and advantages of our improvement to those skilled in the art to which such invention relates so that further detailed description will not be required. It is, of course, to be understood that we do not wish to be limited to the precise features of construction herein set forth and hold ourselves entitled to such changes therefrom as fairly fall within the scope of what we claim without departing from the spirit of or sacrificing any of the advantages of the invention.

Having described the invention, we claim:—

1. In a device for the purpose set forth, a housing, a double threaded worm screw revoluble in the housing, half nuts guided in the housing and engaged by the threads of the worm screw, each of said nuts having a rack surface, a toothed wheel engaging the respective rack surfaces, a shaft for the toothed wheel journaled tranversely through the housing.

2. In a device for the purpose set forth, a two-part housing, comprising a member which is rectangular in cross section and has reduced ends provided with reduced rounded extensions, a steering rod having its ends journaled in the said extensions and having a central cross sectionally rounded head received in the housing proper, said head having outwardly projecting angularly disposed V-shaped lugs whose walls are arranged at opposite angles to define right and left hand screws, half nuts guided in the housing and arranged in the opposite sides of the double worm and having respectively right and left hand threads to engage said screws, each of said nuts having a grooved parts whose inner wall is toothed, a shaft journalled transversely through the housing and a toothed wheel on the inner end of the shaft meshing with the teeth on the nuts.

3. In a device for the purpose set forth, a two-part housing, comprising a member which is rectangular in cross section and has reduced ends provided with reduced rounded extensions, a steering rod having its ends journaled in the said extensions and having a central cross sectionally rounded head received in the housing proper, said head having outwardly projecting angularly disposed V-shaped lugs whose walls are arranged at opposite angles to define right and left hand screws, half nuts guided in the housing and arranged in the opposite sides of the double worm and having respectively right and left hand threads to engage said screws, each of said nuts having a grooved part whose inner wall is toothed, a shaft journaled transversely through the housing, a toothed wheel on the inner end of the shaft meshing with the teeth on the nuts and said wheel having a central enlargement which contacts with the double worm screw.

In testimony whereof we affix our signatures.

CHARLES A. SEIFERT.
ARTHUR E. SCHARF.